Feb. 11, 1969   C. POOL   3,426,986

SHOCK ISOLATING LEG ASSEMBLY

Filed Jan. 5, 1968

INVENTOR.
CLARENCE POOL
BY
W. H. Maxwell
AGENT

United States Patent Office

3,426,986
Patented Feb. 11, 1969

3,426,986
SHOCK ISOLATING LEG ASSEMBLY
Clarence Pool, 8321 Passons Blvd.,
Pico Rivera, Calif. 90660
Filed Jan. 5, 1968, Ser. No. 696,059
U.S. Cl. 248—24
Int. Cl. F16f 15/04
8 Claims

ABSTRACT OF THE DISCLOSURE

This invention relates to legs for the support of delicate devices which can be damaged by the transmission of shock therethrough, and provides a leg directly engageable upon a support, a mounting fixed to said device movably receiving the leg, means extensibly biasing the leg to project from the mounting and yieldingly supporting said device, and a retainer releasably secured to the mounting to retain the said means in operative relation to the leg and extending the same for support of said device. One or more such assemblies are installable directly into the frame of the supported device.

---

Delicate devices, whatever nature they might be, can be damaged by impact when setting them down or by shock waves and/or vibrations transmitted through the support upon which said devices are engaged or installed. Conversely, there are impacts and/or vibrations produced by such devices which require shock isolation, and it is the leg structure per se which is treated herein and provided with features for eliminating the transmission of damaging shock waves. In other words, structural continuity is interrupted insofar as transmission of energy is concerned, while integrity is maintained insofar as assembly of the leg to the device is concerned. It is an inexpensive and yet highly efficient and practical leg which is the primary object of this invention and which is realized with the fewest number of readily manufactured parts, each of which presents a configuration that renders its place in the assembly obvious.

An object of this invention is to provide a leg of simple and practical construction and through which direct engagement with a support is attained with minimized unsprung weight. That is, the inertia in the leg part is virtually reduced to its minimum, lightweight materials of reduced volumetric displacement being practical and with the application of supporting pressures at or near the plane of support.

Another object of this invention is to provide a mounting for the direct application or installation into a frame or base, requiring but a single opening in said frame or base, and a mounting which snaps into operating displacement by the installation of a retainer. The mounting has for its primary purpose the reciprocal carriage of the above mentioned leg and for its secondary purpose the capture of said leg within predetermined and limited bounds of extension from said mounting. Further, the relative configurations of the leg and mounting are such as to provide for increased lateral displacement of the leg as depression of the leg into the mounting occurs. Conversely, as the leg is extended the said lateral displacement is gradually reduced, and is minimized when the leg is fully extended from the mounting.

It is another object of this invention to provide means for the application of supporting pressures at or near the plane of support, while the assembly of the leg and mounting therefor guides the device being supported so that it has a predetermined position without being subjected to continuous sway or like oscillations.

It is still another object of this invention to provide a retainer for releasably securing the means supplying pressures and the leg and mounting assembly operated together thereby, in a positive locked condition immune to accidental disassembly. With the four parts of the assembly related as thus far referred to, the transmission of energy through the leg assembly is disrupted and both the vertical and lateral displacements and/or movements damped.

The various objects and features of this invention will be fully understood from the following detailed description of the typical preferred form and application thereof, throughout which description reference is made to the accompanying drawings, in which.

Figure 1:
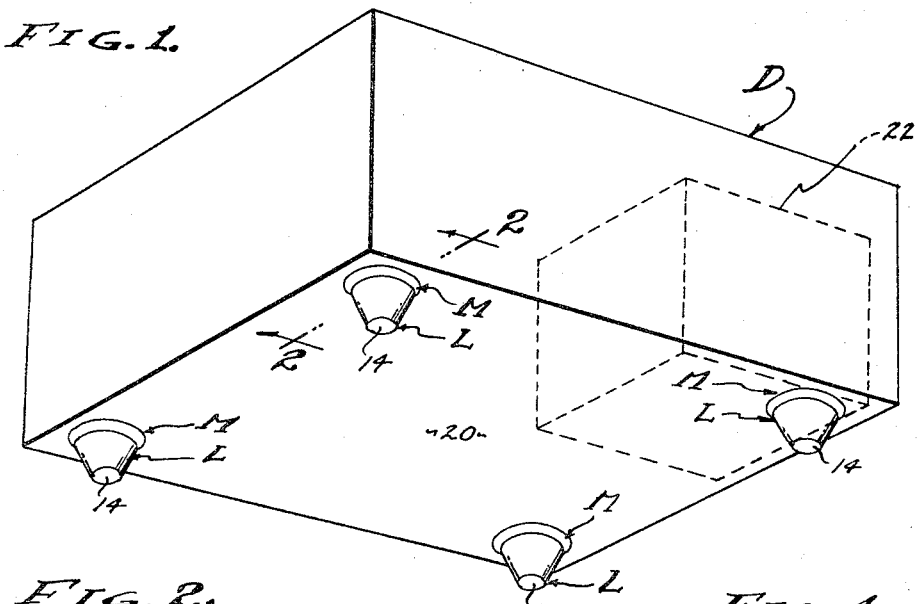
FIG. 1 is a perspective view of an asymmetrically balanced device supported by selectively biased shock isolating leg assemblies of the present invention.
Figure 2:
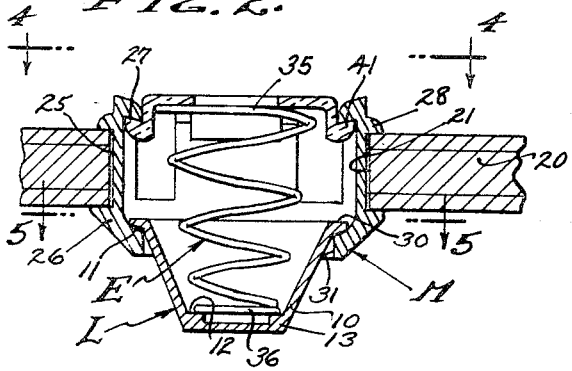
FIG. 2 is an enlarged detailed sectional view taken as indicated by line 2—2 on FIG. 1, showing the leg per se in an unloaded and extended position.
Figure 4:
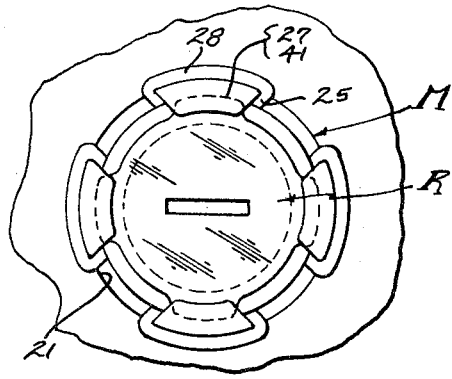
Figure 3:
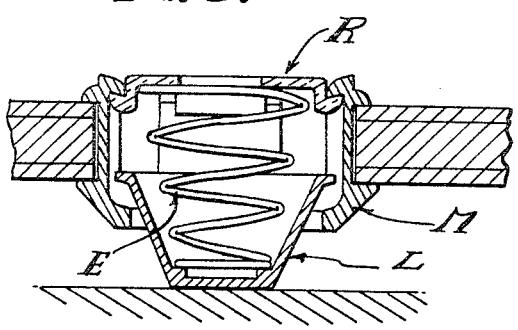
FIG. 3 is a view similar to FIG. 2 and illustrates the leg per se in its normally depressed position, as it is preloaded by means of the weight that is supported thereby.
Figure 5:
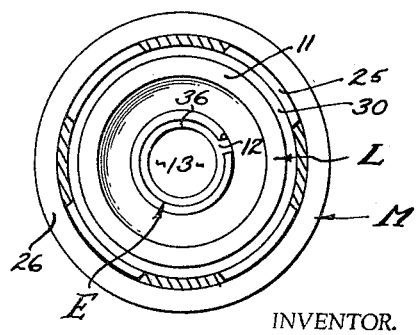

And, FIGS. 4 and 5 are views taken as indicated substantially by lines 4—4 and 5—5 on FIG. 2.

The shock isolating leg assembly involves the fewest number of readily manufactured parts, and having for its primary objective structural integrity with interruption of energy transmission therethrough. Generally, the parts involved include, a leg L, a mounting M, extension means E, and a retainer R. These four parts cooperate to establish a structurally intact support fixedly engaged with the device supported, and held intact without resort to other fasteners by virtue of the installed condition. Functionally, the leg L is of minimized inertia and is held extended in a biased supporting condition, subject to displacements upwardly, downwardly and laterally; that is, the leg is movable relative to the supported device D in omni directions. Functionally, the extension means E biases the leg L into aligned and centered engagement in the mounting M, and according to the invention exerts sufficient pressure to partially extend the leg while carrying the device supported thereby (or that portion of the device which is supported thereby). Functionally, the retainer R is the key part which captures the leg assembly in a cooperative arrangement of parts, and simultaneously captures the leg assembly installed on the device to be supported.

The leg L is an elongated part formed concentrically about a vertically disposed axis, being of depending tubular cross section. That is, the leg is a columnar part and it is preferably cylindrical, having a vertically disposed wall 10, a horizontally disposed upper rim 11, and a horizontally disposed lower seat 12. The portions 10, 11 and 12 are completely circular in form, with a foot 13 underlying the seat 12. In practice, the foot 13 is disposed in a horizontal plane normal to the vertical axis and closes the leg, furnishing a face 14 for rested engagement with a support. Further, the foot 13 and its face 14 can be fastened down when circumstances require. In accordance with the invention, the leg L is a downwardly tapered cylinder form truncated at the foot 13. The lower seat 12 is an upwardly faced circular step at the joinder of the wall 10 and foot 13 while the upper rim 11 is a downwardly faced conical step at the uppermost extent of the wall 10. In other words, and generally speaking, the leg part L is an inverted hat-shaped part having a downwardly active rim 11 and an upwardly faced seat 12 at its interior lower extremity.

The mounting M is also an elongated part formed concentrically about the vertically disposed axis, being a through part of tubular cross section. The mounting is preferably cylindrical and of larger diameter than that of the leg L, whereby the leg fits within the mounting with substantial clearance. In carrying out the invention, the device D to be supported has a base member 20 of an established thickness and through which an opening 21 is bored to fit and receive the mounting M. As shown, the mounting M is round, having a vertical wall 25 coextensive with the thickness of the base member 20, for example of ¼ inch extent to accommodate itself to a plywood wall of ¼ inch thickness. It is to be understood that said vertical extent of wall 25 can vary so as to accommodate sheet materials of various thicknesses all as may be required. Alternately, any variations in base member thickness can be accommodated by employing a shim or adapter. In accordance with the invention, the mounting M is comprised of a body portion 26 that has surrounding engagement, around opening 21, with the downwardly disposed face of the base member 20, and of the vertical wall 25 that projects through the opening 21 to emanate at the top side of the base member 20. The wall 25 is sectional, much the same as a castlelated nut, and to the end that the wall 25 comprises a plurality of upstanding fingers. As shown, the inner diameter of wall 25 substantially exceeds the outer diameter of rim 11, there being inward and outward shoulders 27 and 28, the latter being in opposition to the body portion 26. A feature of the present invention is the semi-spherical seat 30 in the body 26, said seat being upwardly faced for self-alignment and self-centering reception of the leg L. Specifically, it is the rim 11 of the completely depressed leg that has lower perimeter engagement with the concavity of the seat 30. And, as shown, the seat 30 extends diametrically inward from the wall 25 to an aperture 31 having substantial clearance from the outer diameter of the downwardly tapered leg wall 10. As shown, the seat 30 is at about the plane of, or below, the bottom face of the supported base member 20, the body 26 being of nominal vertical extent.

In practice, the device D to be supported is most often asymetrically balanced. That is, a heavy part such as a transformer 22 of a power supply is likely to be located at one end and/or at one corner of the device (as shown). In other words, a usual device D will have an offset center of gravity, and all of which requires selective use of the shock mountings. Therefore, it is imperative for a proper shock isolating installation to select mountings that are biased so as to meet the weight applied at the portion of the device supported by the mountings involved. For example, a stronger bias is required beneath the transformer 22 than at the lighter remote end of the device.

The extension means E is a biasing element that yieldingly urges the leg L downwardly to a normally partially extended position and to a stopped position, means of the rim 11 engaging upon the seat 30. A most practical form of means E is a helical compression spring 34 having a normally disposed dead end 35 seated at the upper end of the mounting M, and having a normally disposed live end 36 actively engaged against the lower seat 12 in the leg L. Thus, the end 35 is larger than the end 36, the end 35 being centered in the substantially large diameter of the wall 25 and the end 36 being centered in the substantially smaller diameter of the reduced cone of the leg L. Thus, the spring 34 is compressible a predeterminable distance along its operable axis, and a measure of depressibility as related to units of loading can be predicted as circumstances require.

The retainer R is the key or closure element of the combination of parts, it being preferred to make the parts L, M and R of the same material, preferably a molded plastic such as polyolefin or polycarbonate, the latter being transparent for purposes later described. Thus, the material applied has substantial resilience, in which case the sectional wall 25 presents upwardly disposed finger-like projections that can deflect inwardly, whereby the mounting M can be forced and/or snapped into the opening 21. For positive retainment on the base member 20, the retainer R is of disc configuration, having an outer diameter 40 adapted to enter within the wall 25 and with hooks 41 to engage beneath the shoulder 27, so as to snap into placement. Thus, the retainer seats the uppermost end 35 of the spring member 34 and simultaneously locks the shoulder 28 onto the top of the base member 20. In practice, the retainer R has circumferentially spaced interruptions complementary to the sectional interruptions in the wall 25, whereby the retainer R can be depressed beneath the shoulder 27 and then rotated for fixed frictional engagement thereunder and/or reversely operated for removal.

From the foregoing, the construction and installation of the shock isolating leg assembly will be understood. Operationally, the extension means E is designed to depress a measured distance when preloaded with a predeterminable burden or weight applied from the device D supported, so as to normally maintain a partially extended condition. Consequently, the rim 11 is removably held free of the seat 30 and is thereby isolated along the axis of leg L, coincidental with the axis of the mounting M. During displacement and transitory movements, whether at random or in regular oscillatory patterns, the clearance of the rim 11 within the wall 25 permits substantial movements before frictional damping engagement of the leg L against the mounting M occurs.

In practice, the retainer R is made of the transparent material, for the purpose of enabling a visible inspection of the bias means E, the springs 34 of said means being color coded, or the like, so that the support capabilities thereof can be determined by a visual inspection. In any event, the return to a normal partially extended leg position is gentle and assured by proper selection of the color coded springs 34 and aligning—centering action assured by the cooperative leg and mounting and bias means configurations.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:
1. A shock isolating assembly for installation through an opening in a device to be supported thereby and including,
   a tubular mounting to be projected through said opening, and having a lower base member with a body portion to engage the device from beneath surrounding said opening therein, and having a vertically disposed wall with a downwardly disposed shoulder opposed to said body portion to engage the device from above surrounding said opening therein, and having a downwardly opening aperture surrounded by an upwardly faced seat projecting inwardly from the wall, and with a downwardly disposed shoulder opposed to said seat,
   a tubular leg to be extended from the tubular mounting and having a rim engageable upon and depressible from the seat in said mounting, a cylindrical wall depending from the rim and movable laterally relative to the wall of said mounting, there being an upwardly faced seat within and at the lower extremity of said wall,
   an extension means operable under compression between the last mentioned seat and the last mentioned shoulder in the tubular mounting and carrying the rim of the leg free of the first mentioned seat when bearing the weight of the device supported, and
   a retainer engageable beneath the said last mentioned seat to engage and thereby bias the extension means.
2. The shock isolating leg assembly as set forth in claim 1 and wherein, the vertically disposed wall of the mounting is circumferentially interrupted to form finger-like projections thereof and which are inwardly depressible for installation through the opening in the device to be supported.

3. The shock isolating leg assembly as set forth in claim 1 and wherein, the vertically disposed wall of the mounting and the downwardly disposed shoulder opposed to the said seat are circumferentially interrupted to form finger-like projections thereof, and wherein the retainer is engageable within the said tubular mounting wall and beneath said shoulders of said finger-like projections, thereby to lock the said tubular mounting wall outwardly in installed engagement with the opening in the device.

4. The shock isolating leg assembly as set forth in claim 1 and wherein, the vertically disposed wall of the mounting and the downwardly disposed shoulder opposed to the said seat are circumferentially interrupted to form finger-like projections thereof, and wherein the retainer has complementary and upwardly disposed elements releasably engaged within the said tubular mounting wall and with said shoulders of said finger-like projections, thereby to lock the said tubular mounting wall outwardly in installed engagement with the opening in the device.

5. The shock isolating leg assembly as set forth in claim 1 and wherein, the vertically disposed wall of the mounting and the downwardly disposed shoulder opposed to the said seat are circumferentially interrupted to form finger-like projections thereof and which are inwardly depressible for installation through the opening in the device to be supported, and wherein the retainer has complementary and upwardly disposed elements releasably engageable within the said tubular mounting wall and with said shoulders of said finger-like projections, thereby to press the said finger-like projections outwardly into installed engagement with the opening in the device.

6. The shock isolating leg assembly as set forth in claim 1 and wherein, the last mentioned and upwardly faced seat in the tubular mounting is concaved, and said rim of the tubular leg has centering lower perimeter engagement therewith.

7. The shock isolating leg assembly as set forth in claim 1 and wherein, the vertically disposed wall of the mounting is circumferentially interrupted to form finger-like projections thereof and which are inwardly depressible for installation through the opening in the device to be supported, and wherein the last mentioned and upwardly faced seat in the tubular mounting is concaved, and said rim of the tubular leg has centering lower perimeter engagement therewith.

8. The shock isolating leg assembly as set forth in claim 1 and wherein, the vertically disposed wall of the tubular mounting is cylindrical and with the downwardly disposed shoulder opposed to the said seat is circumferentially interrupted to form finger-like projections thereof and which are inwardly depressible for installation through the opening in the device to be supported, wherein the tubular leg is a cylindrical and downwardly tapered cone having substantial lateral clearance within the tubular mounting, and wherein the retainer has complementary and upwardly disposed elements releasable engageable within the said tubular mounting wall and with said shoulders of said finger-like projections, thereby to press the said finger-like projections outwardly into installed engagement with the opening in the device.

References Cited

UNITED STATES PATENTS

| | | | |
|---|---|---|---|
| 2,145,037 | 1/1939 | Bennettt | 248—24 XR |
| 2,207,507 | 7/1940 | Douglass | 248—27 XR |
| 2,890,544 | 6/1959 | Manausa | 248—188.9 |
| 2,974,352 | 3/1961 | Lockwood | 16—42 |

JOHN PETO, *Primary Examiner.*

U.S. Cl. X.R.

248—188, 188.8